(12) United States Patent
Allen et al.

(10) Patent No.: US 11,210,741 B1
(45) Date of Patent: *Dec. 28, 2021

(54) AUTOMATED METHODS OF INSPECTION

(71) Applicant: United Services Automobile Association (USAA), San Antonio, TX (US)

(72) Inventors: Michael J. Allen, San Antonio, TX (US); Cleburne Burgess, Fair Oaks Ranch, TX (US); John H. Amstutz, San Antonio, TX (US); Shanna Ruth Limas, San Antonio, TX (US); Ramon M. Lopez, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/442,356

(22) Filed: Jun. 14, 2019

Related U.S. Application Data

(63) Continuation of application No. 14/275,640, filed on May 12, 2014, now Pat. No. 10,373,256.
(Continued)

(51) Int. Cl.
*G06Q 40/08* (2012.01)
*G06Q 10/10* (2012.01)
*G06Q 40/00* (2012.01)

(52) U.S. Cl.
CPC ............. *G06Q 40/08* (2013.01); *G06Q 10/10* (2013.01); *G06Q 40/00* (2013.01)

(58) Field of Classification Search
CPC .................................................. G06Q 10/0635
(Continued)

(56) References Cited

U.S. PATENT DOCUMENTS

| 4,766,539 A * | 8/1988 | Fox | G06Q 40/02 705/4 |
| 6,021,397 A | 2/2000 | Jones et al. | |

(Continued)

FOREIGN PATENT DOCUMENTS

| CA | 2429767 | 6/2004 | |
| CA | 2429767 A1 * | 6/2004 | G06F 17/60 |

OTHER PUBLICATIONS

U.S. Appl. No. 14/275,640, filed May 12, 2014, Automated Methods of Inspection.
(Continued)

*Primary Examiner* — Hani M Kazimi
*Assistant Examiner* — Paul R Kloberg
(74) *Attorney, Agent, or Firm* — Perkins Coie LLP (57) ABSTRACT

Methods and systems for providing automated methods of inspections that facilitate loss reporting and resolution are described. In some embodiments various remote evaluation tools are provided to collect information from remote locations. This information can be used to generate automated damage estimates which in turn can be used to direct the ordering of supplies, materials, and other resources. In addition, pre-damage and post-damage evaluations of an insured property may be collected using the remote evaluation tools. These evaluations can be used by adjusters (human adjusters and computer-based adjusters) to identify damage and process claims more efficiently.

20 Claims, 7 Drawing Sheets

Related U.S. Application Data (60) Provisional application No. 61/822,211, filed on May 10, 2013.

(58) Field of Classification Search
   USPC .................................................................. 705/4
   See application file for complete search history.

(56) References Cited

U.S. PATENT DOCUMENTS

| | | | | |
|---|---|---|---|---|
| 7,949,548 | B2 * | 5/2011 | Mathai | G06F 16/29 |
| | | | | 705/4 |
| 7,966,203 | B1 * | 6/2011 | Pietrzak | G06Q 40/08 |
| | | | | 705/4 |
| 8,229,768 | B1 | 7/2012 | Hopkins, III | |
| 8,229,769 | B1 | 7/2012 | Hopkins, III | |
| 8,280,633 | B1 * | 10/2012 | Eldering | G06Q 40/08 |
| | | | | 702/3 |
| 8,346,578 | B1 | 1/2013 | Hopkins, III | |
| 8,401,896 | B2 * | 3/2013 | Wargin | G06Q 30/0225 |
| | | | | 705/4 |
| 8,756,085 | B1 * | 6/2014 | Plummer | G06Q 40/08 |
| | | | | 705/4 |
| 10,373,256 | B1 | 8/2019 | Allen et al. | |
| 2001/0042785 | A1 | 11/2001 | Walker et al. | |
| 2003/0040934 | A1 | 2/2003 | Skidmore et al. | |
| 2004/0117302 | A1 | 6/2004 | Weichert et al. | |
| 2004/0239550 | A1 * | 12/2004 | Daly, Jr. | G01S 13/723 |
| | | | | 342/26 B |
| 2006/0259234 | A1 | 11/2006 | Flynn et al. | |
| 2007/0063866 | A1 * | 3/2007 | Webb | G01D 4/004 |
| | | | | 340/870.02 |
| 2008/0114655 | A1 * | 5/2008 | Skidmore | G06Q 10/10 |
| | | | | 705/14.36 |
| 2008/0133430 | A1 | 6/2008 | Horowitz | |
| 2008/0267487 | A1 | 10/2008 | Siri | |
| 2009/0138290 | A1 | 5/2009 | Holden | |
| 2009/0177500 | A1 | 7/2009 | Swahn | |
| 2009/0265193 | A1 * | 10/2009 | Collins | G06Q 30/0185 |
| | | | | 705/4 |
| 2010/0235198 | A1 | 9/2010 | Fini et al. | |
| 2010/0245164 | A1 * | 9/2010 | Kauffman | G01S 7/41 |
| | | | | 342/26 B |
| 2010/0245165 | A1 * | 9/2010 | Kauffman | G01S 13/953 |
| | | | | 342/26 B |
| 2011/0218825 | A1 | 9/2011 | Hertenstein | |
| 2012/0123806 | A1 | 5/2012 | Schumann, Jr. et al. | |
| 2012/0209782 | A1 | 8/2012 | Pershing et al. | |
| 2013/0060710 | A1 * | 3/2013 | Preuss | G06Q 50/163 |
| | | | | 705/314 |
| 2013/0216089 | A1 | 8/2013 | Chen et al. | |
| 2013/0226624 | A1 * | 8/2013 | Blessman | H04N 7/183 |
| | | | | 705/4 |

OTHER PUBLICATIONS

U.S. Appl. No. 61/822,211, filed May 10, 2013, Automated Methods of Inspection.

* cited by examiner

AUTOMATED METHODS OF INSPECTION

CROSS-REFERENCE TO RELATED APPLICATIONS

This application is a continuation of U.S. patent application Ser. No. 14/275,640, entitled "AUTOMATED METHODS OF INSPECTION", filed on May 12, 2014, now allowed; which is a non-provisional of and claims priority to U.S. Provisional Application No. 61/822,211, entitled "AUTOMATED METHODS OF INSPECTION," filed May 10, 2013, which is incorporated herein by reference in its entirety for all purposes.

TECHNICAL FIELD

Various embodiments of the present technology generally relate to property losses. More specifically, various embodiments relate to automated methods of inspection for property and casualty insurance claims.

BACKGROUND

Property and casualty insurance can be purchased to provide financial protection for covered losses. There are many types of property and casualty insurance to cover various properties and types of losses. For example, homeowner's insurance is designed to cover various types of losses to an individual's home. Similarly, auto insurance is designed to cover various types of losses to an automobile. After a weather or loss event, such as fire, wind, water, accident, hurricane, hail storm, wildfire, or tornado, property losses may be incurred. In the most severe cases, policyholders require assistance finding shelter, obtaining basic supplies, beginning the rebuilding process, etc. Other policyholders with less severe damage may not immediately be aware of property losses that they have sustained and may fail to contact the insurance company until several months after the weather or other loss event. However, most insurance policies expect to be notified within a certain amount of time after a loss event has occurred. After reporting, an insurance adjuster will typically be assigned to investigate the loss and make a determination regarding a payout amount.

BRIEF DESCRIPTION OF THE DRAWINGS

Embodiments of the present disclosure will be described and explained through the use of the accompanying drawings in which.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to property losses. More specifically, various embodiments relate to automated methods of inspection for property and casualty insurance claims. Various embodiments enable an insurance provider to remotely evaluate property losses. Some embodiments provide for directed streaming video to aid in an automated or remote analysis, creating estimates, and assessment of resource utilization. Some embodiments allow for a directed real-time video feed having the ability to direct whoever is showing the damage (e.g., insured, adjustor, contractor, specialist, etc.) to various areas that need to be captured and seen in order to properly handle a claim. In some cases, additional images (e.g., still images, thermal images/video, etc.) may also be captured in addition to the video feed that may be straight video or previously captured video. Various technologies can be used for directing whatever source is taking that video to the areas of interest that need to be captured. For example, during a live interactive video feed, a remote view can request the user move over to the left, show underneath a table, etc. The end user can provide his assessment/comment through the video channel as well as create an interactive system for analyzing claims.

The video feed along with other assessment tools may be automated in various embodiments. For example, a remote analysis platform or inspection engine may be capable of connecting to various smart home technology, smoke detectors, water sensors, heat sensors, video cameras, robots, unmanned aerial systems, unmanned vehicle systems, imaging devices, material recognition and change detection software, various sensors, etc. The data collected from these devices can be collected and returned to the remote analysis platform. The remote analysis platform can then generate reports, automated estimates, request additional information from adjustors, automatically order supplies (e.g., water, blankets, gasoline, lumber, etc.) and reserve other resources (e.g., busses, hotel rooms, etc.). All of this information could be used in creating the automated estimates as described above. In some embodiments, this information can be used to identify various response levels and the resources needed when aggregated throughout the catastrophic event area.

In some embodiments, the remote analysis platform has a registration process for connecting to the smart home technology along with other assessment tools. The process may be automatically initiated from the remote analysis platform or a central controller for the smart home. As a result, the remote analysis platform can receive information about the property at regular intervals or upon detection of an event. The information collected may also include pre-event data. This pre-event data can be used in the underwriting process. For example, the size of the house, size and type of the roof, types of furniture, types of flooring, type of construction, etc. can all be collected and used in the underwriting process. This data can then be automatically populated into the automatically generated estimates as described above.

In some embodiments, claims may be opened and begun before the customer reports the losses, thus speeding up resolution of losses. For example, roof inspections may be ordered automatically for applicable losses. Customer reports may be used in assessing the claims for later-reporting customers. For example, if a customer reports hail damage and the insurance provider has verified the claim, a customer living on the same street likely experienced similar hail damage as well. Customers who have not reported damage may be notified of these potential losses and informed of times when an insurance adjustor will be available for an inspection. The weather data may be used to investigate fraudulent claims as well. For example, prior to a weather event, images may be taken for comparison with images taken after the weather event takes place to verify that the weather event was the cause of any reported damage.

In some embodiments, electrical grid data may be used in making property loss assessments. For example, if electrical grid data indicates that the customers did not have power for two days, the insurance provider may assume that the insureds will have claims for food spoilage. In such cases, claims may be automatically paid out without further inspection or documentation.

In the following description, for the purposes of explanation, numerous specific details are set forth in order to provide a thorough understanding of embodiments of the present disclosure. It will be apparent, however, to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, ROMs, random access memories (RAMs), erasable programmable read-only memories (EPROMs), electrically erasable programmable read-only memories (EEPROMs), application-specific integrated circuits (ASICs), magnetic or optical cards, flash memory, or other types of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the present invention, and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

General Description

Figure 1:
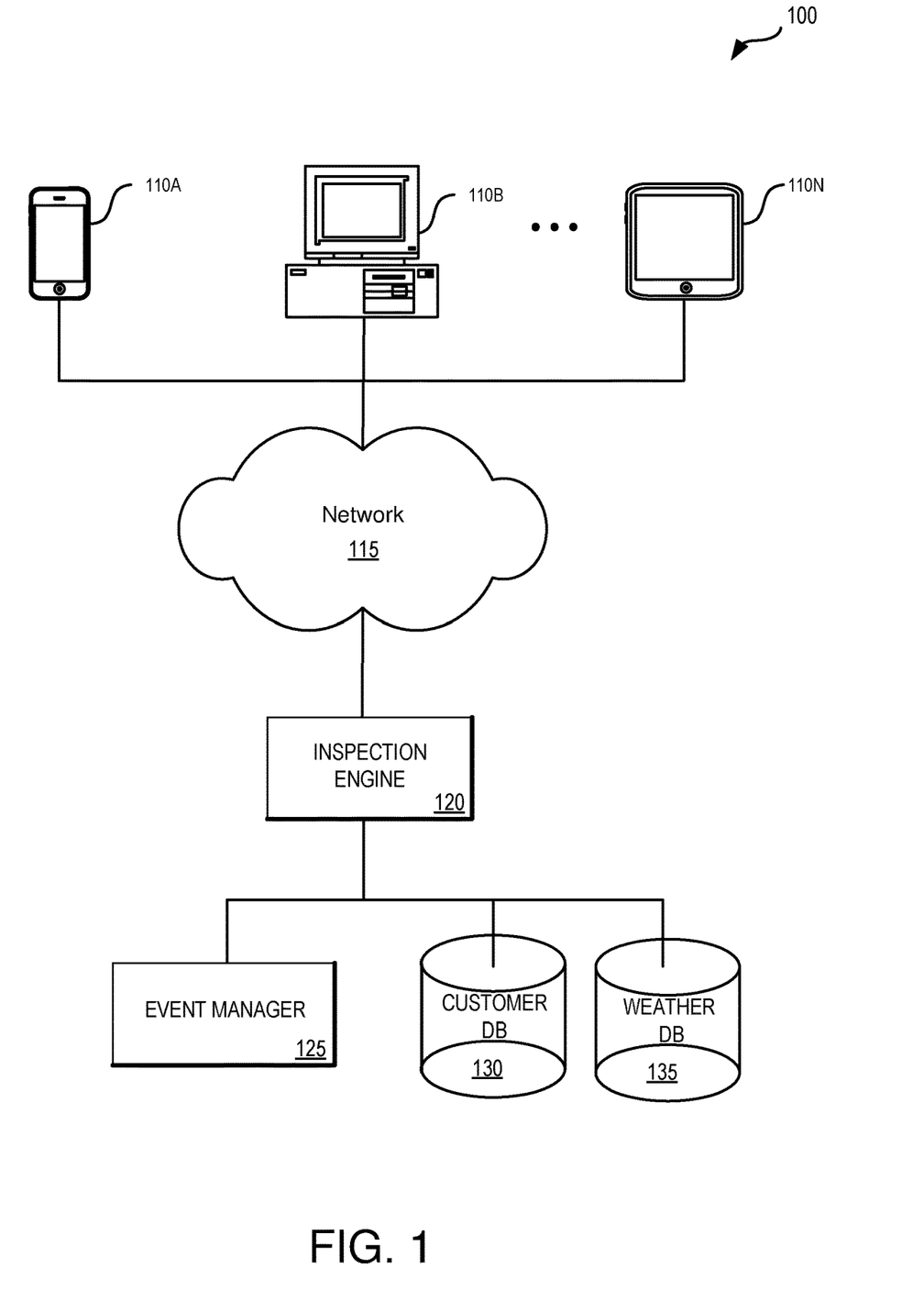
FIG. 1 illustrates an example of a network-based environment in which some embodiments of the present disclosure may be utilized.

FIG. 1 illustrates an example of network-based environment 100 in which some embodiments of the present invention may be utilized. As illustrated in FIG. 1, network-based environment 100 may include one or more points of interaction or remote evaluation tools 110A-110N (such as a mobile device, a mobile phone, a tablet computer, a mobile media device, wearable computing devices, smart home technology devices, sensors, vehicle-based computers, etc.). These points of interaction or remote evaluation tools can include mechanisms for collecting information automatically and/or manually through one or more user interfaces. Once collected, the information can be reported, by connecting through network 115, to inspection engine 120. For example, points of interaction or remote evaluation tools 110A-110N may run one or more applications or clients that allow a user and/or the devices to interact with inspection engine 120. Such applications may provide access to claims processing systems and interfaces and allow the insurance company to communicate with its customers.

In addition, points of interaction or remote evaluation tools 110A-110N can include network communication components that enable communication with network 115 or other electronic devices by transmitting and receiving wireless signals using licensed, semi-licensed or unlicensed spectrum over network 115. In some cases, network 115 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Network 115 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications networks.

As illustrated in FIG. 1, inspection engine 120 can be communicably coupled to event manager 125 and to one or more databases such as customer database 130 and weather database 135. In some embodiments, inspection engine 120 can be responsible for gathering information about various covered properties before and/or after a loss has occurred. The gathered information can come from one or more remote devices such as sensors, cameras, and the like. Using the gathered information, automated estimates and/or reports may be automatically generated (e.g., by a report module). These automated estimates/reports can include member data along with damage summaries, details, supplies needed for repair, and estimates of repair. In some cases, one or more estimates can be generated for the entire bounded geographical region or a smaller portion of the bounded geographical region (e.g., neighborhood, individual property, selected insured properties, etc.). For example, in some embodiments, an automated estimate may be generated for an individual property of an insured. This report can be automatically generated before or after the first report of a claim or first notice of loss. As a result, an adjustor will receive a draft estimate that is as complete as possible. Hence, the adjustor can save significant amount of time by simply confirming each entry and editing as appropriate.

In some cases, the estimates may be prepared, edited, or reviewed remotely by one or more adjustors and/or other resources. For example, the remote adjustors could use directed streaming video as described in more detail below and/or other data layers to further prepare, edit, and/or approve the automatically generated estimate. The adjustors could be selected based on skills or training (e.g., estimates for water damage, roof repairs, structural damage, fire damage, etc.). As a result, adjustors with a specific, narrower, or lower skill set can be sent on site to the damaged properties to confirm any remaining questions or review needed by the remote adjustors. In some embodiments, one or more automated tools (e.g., software and/or hardware systems) may help in the preparation, editing, and/or review of the estimates.

The automated estimates can be generated based on multiple layers of data. For example, the data can be weather data, third-party vendor data, aerial imagery, 3D diagrams, data from smart home devices, thermal imagery, etc. The data may be raw data that can be processed (e.g., by a data processing module) for damage recognition and also material recognition. In other cases, the data may have already been processed into one or more reports or images. In addition, historical data regarding the house (e.g., gather before the weather event) can be used in creating the estimates. By integrating all of the available information, the automated estimates can be created. For example, suppose one subsection of the bounded geographic area was hit by four inch hail. Based on this weather event, damage to the roof, the siding, and other different damages will likely occur. By overlaying all of the available data (both historical, customer specific, recent, and real-time) an estimate can be built, written, and/or otherwise created having line items based on the consumer profiles and other data layers. These automated reports can be communicated to other adjustors, suppliers, and/or other system components. In some cases, these may be automated reports generated by inspection engine 120 used to automatically reserve or order supplies and/or resources.

Customer database 130 and weather database 135 can have a variety of information that can be utilized by inspection engine 120 and/or event manager 125. For example, customer database 130 can store information about members (or customers) of a membership organization (or financial institution). For example, customer database 130 can include information such as name, address, age, employer, total balance of all accounts held at the membership organization, credit ratings, home ownership information, automobile information, annual salary, length of membership, membership level, policy details and/or other information. Weather database 135 may include weather information such as weather intensity profiles and weather duration profiles that can be used by the event manager 125 in predicting a catastrophic event, estimating property losses and resource needs, and allocating the resources. Weather database 135 may include future weather data (weather predictions) and weather data associated with weather events that already occurred. In addition, weather database 135 may include batch data communications and/or real-time or near real-time feeds of various weather information. In some cases, event manager 125 and/or inspection engine 120 may automatically activate or deactivate the data feeds based on indicators of the severity of the weather event.

Event manager 125 may use weather information from the weather database 135 and customer information from the customer database 130 to proactively respond to impending or incurred property losses from loss events by acquiring weather data associated with the event, estimating the severity of the losses caused by the event, predicting the amount and type of resources likely needed to address the losses, notifying customers, opening loss reports, sending the appropriate insurance adjustors or inspectors (if needed), ordering supplies, etc.

Figure 2:
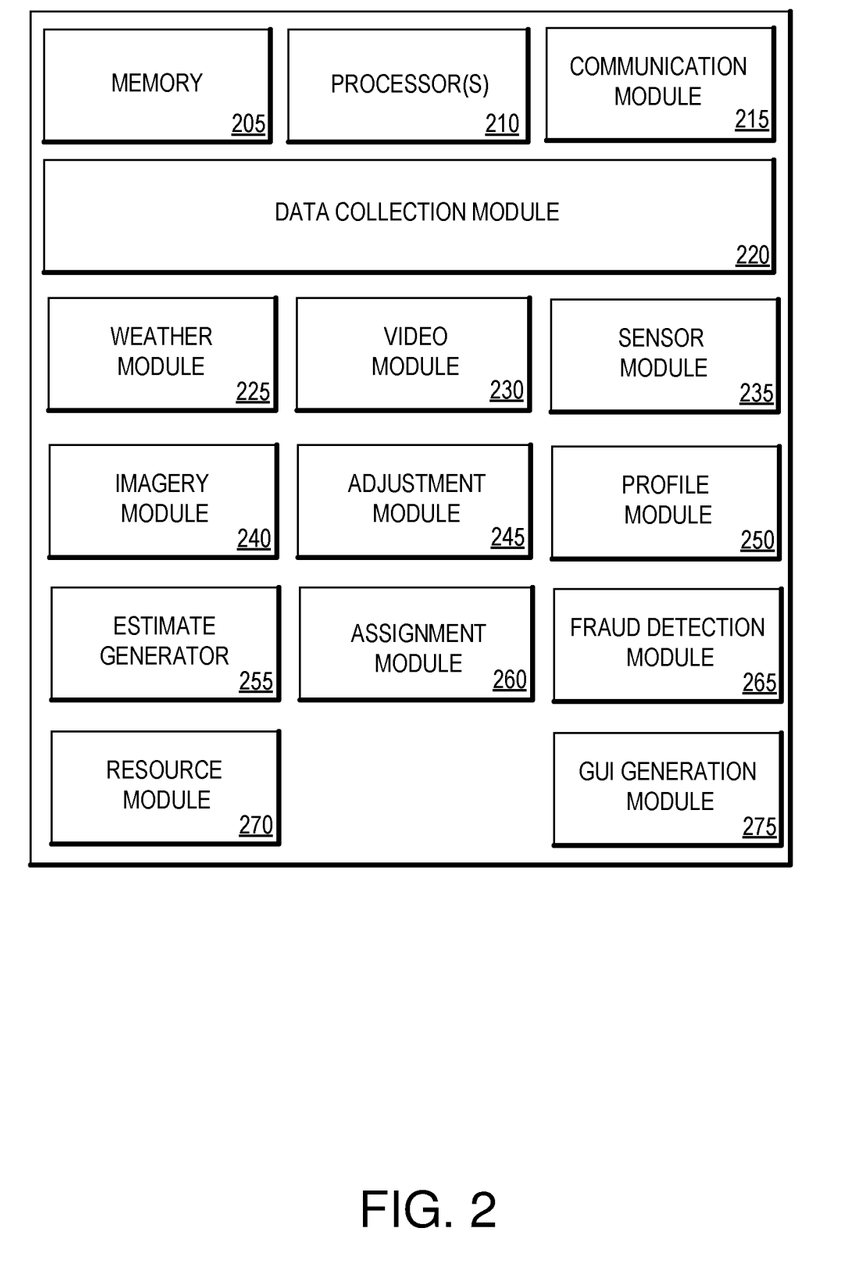
FIG. 2 is a block diagram illustrating exemplary components of an inspection engine according to one or more embodiments of the present disclosure.

FIG. 2 is a block diagram illustrating components that can be included in inspection engine 120. According to the embodiments shown in FIG. 2, memory 205, processor(s) 210, communication module 215, data collection module 220, weather module 225, video module 230, sensor module 235, imagery module 240, adjustment module 245, profile module 250, estimate generator 255, assignment module 260, fraud detection module 265, resource module 270, and Graphic User Interface (GUI) generation module 275. Other embodiments of the present disclosure may include some, all, or none of these modules and components along with other modules, applications, and/or components. The modules and components illustrated in FIG. 2 may be hardware, firmware, or software or a combination. Still yet, some embodiments may incorporate two or more of these modules into a single module and/or associate a portion of the functionality of one or more of these modules with a different module. For example, in one embodiment, the functionality associated with weather module 225, video module 230, and sensor module 235 may be combined into a single module that allows for the control of remote evaluation tools and data synthesis.

Memory 205 can be any device, mechanism, or populated data structure used for storing information. In accordance with some embodiments of the present disclosure, memory 205 can encompass any type of, but is not limited to, volatile memory, nonvolatile memory and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of communication module 215, data collection module 220, weather module 225, video module 230, sensor module 235, imagery module 240, adjustment module 245, profile module 250, estimate generator 255, assignment module 260, fraud detection module 265, resource module 270, and/or GUI generation module 275.

Communication module 215 may be used to receive and/or transmit messages between devices and/or system components. For example, communication module 215 may be used to send notifications to customers of the impending or incurred losses, claims status, final disposition, requests for additional information, and/or other communications. Communication module 215 may use a variety of channels such as, but not limited to, public and/or private networks, e-mail, SMS text, mobile push notifications, telephone calls, etc. In some embodiments, communication module 215 may translate messages between different formats and/or manage communications between various components.

Data collection module 220 may be configured to collect data from various sources such as, but not limited to, sensors, third-party data streams, customers, and other sources. In some embodiments, data collection module may control and/or interface with weather module 225, video module 230, sensor module 235, imagery module 240, and/or other components for the collection of data.

Weather module 225 can acquire weather data before, during, and/or after a weather event such as a hail storm, a tornado, a hurricane, a wind storm, a cyclone, an ice storm, etc. Weather data may include wind speeds, reports of hail, temperature, precipitation, duration, intensity, and other indications of the weather. In some embodiments, an alert system may be configured to alert an insurance provider that there is an incoming weather event that may cause property losses. When an alert is received, for example, the insurance provider may select a different level of weather information (e.g., from different services, different types of weather data, etc.) and/or collect reports from trusted sources (e.g., by sending an employee to the area).

Video module 230 can collect and process videos of insured properties and/or surroundings. Sensor module 235 can collect and process data from various sensors (e.g., smart home sensors). Imagery module 240 can collect and process data from various image sources (e.g., thermal images, still cameras, etc.) In some cases, video module 230, sensor module 235, and/or imagery module 240 may control the data source or recording device and command (or specify trajectories) of the data source. For example, if the video source is an unmanned aerial vehicle (UAV), then video module 230 may control the flight path and camera setting of the UAV to capture desired information. In some cases, the video may be processed in real-time or near real-time allowing for alterations and/or update flight paths and camera settings to be provided to the UAV. Using adjustment module 245, additional resources and data may be collected.

Insurance providers may estimate costs associated with a claim or a potential claim using the collected data to determine the company's liability and to pay customers quickly. In some embodiments, various profiles may be generated by profile module 250 and used to estimate the costs of the claim. For example, a personal profile may be generated for customers and/or a home/building profile and a weather profile may be generated for homes/buildings (e.g., by a profile generation module). These profiles could be separate profiles or they may be combined into a single policyholder/property profile.

A personal profile may include information relating to the person such as a current monthly mortgage payment, average monthly utility bills, water usage, size of home, and number of family members. The personal profile may also include living preferences such as room temperature, lighting, preferences for hotel rooms and vehicles, favorite restaurants and/or vacation spots, etc. A home profile may include size of the home, typical weather intensity profiles in a bounded geographical area surrounding the home, building materials, building quality, placement of sensors in the home, data collected from sensors, previous weather damage, aerial imagery, videos, inspection notes, soil composition, age of the building, placement of the building (e.g., north or south facing, near trees, etc.), etc. A weather profile of a property may include the number of times the property has been affected by damaging weather, a propensity for damaging weather in the area, current and future weather data in the area around the home, etc.

The personal, home, and weather profiles may be used in a variety of ways to fulfill various purposes. The personal profiles, home profiles, current aerial images video, and/or weather information may be combined to generate an insurance quote for a customer (e.g., by a quote generation module). In another example, insurance companies may use information included in the profiles to estimate costs after a weather event or other event (e.g., by an estimation module). Such estimated costs may include additional living expenses due to the customer being displaced from her home such as hotel rooms or other temporary living expenses. In an example, the personal profile may be used to estimate the customer's average monthly bills that the insurance company will be responsible for paying while the customer is in temporary housing.

Insurance companies may also use the profiles to estimate the cost of repair of insured properties using estimate generator 255. Repair costs may vary greatly depending upon the type of materials damaged, the square footage of the home, etc. The insurance company may estimate costs using the customer's typical living expenses documented in the customer's personal profile and the materials needed to repair the home documented in the home profile. Using the future or current weather data, some costs may be estimated prior to the damage being incurred and a loss report may be started prior to the customer providing a notice of loss.

The profiles may be used in other contexts as well. For example, if a customer is considering moving to a home with additional square footage, the customer may estimate increases in utilities based on the customer's current utility usage and square footage. In another example, the customer's personal profile may be used in connection with third parties, such as a hotel operator. For example, when the hotel detects that the customer has arrived, the customer's hotel room may be automatically set for customer based on the profile (e.g., room temperature, lighting, etc.). In some embodiments, the profile may be provided to the third party during a reservation process.

Assignment module 260 can be used to select an adjustor or read scoper/damage inspector with the appropriate skill set to review the loss, property, data, loss reports, and/or other information or sites. Fraud detection module 265 may be configured to identify suspicious or fraudulent reports of losses. For example, the fraud detection module 265 may determine that a loss report is potentially fraudulent based on a location of the insured property and the weather intensity profile in the location of the insured property. Fraud detection module 265 may also leverage data from sensors, images, and reports from sightings in a social space. In an example, fraud detection module 265 may be used to detect that there is no evidence that a hail event occurred on a particular street or in the general vicinity by determining that no customers reported hail in the area and weather data did not indicate hail occurring near the vicinity. Fraud detection module 265 may note that the claim needs further investigation or review and provide a notification to an employee processing the claim as selected by assignment module 260. This may be particularly helpful in cases where roofing companies approach policyholders and urge policyholders to file a claim of hail damage.

In some embodiments, images and other data may be taken of insured properties in the geographical area prior to the loss event, and those images may be used to verify that the reported property losses were caused by the loss event. For example, a fraudulent report may be identified if a satellite image of a home shows that prior to a weather event, a roof appears to be damaged, and after the weather event, the roof looks no different. In some embodiments, the images and/or other data recording may be taken based on the predicted loss event (e.g., as predicted by event manager 125).

Resource module 270 can predict resource utilization based on estimated property losses. Resource utilization module 270 may be further configured to estimate customer needs based on levels of insurance and company preferences. For example, if a neighborhood has a high density of customers and the damage is likely severe in that neighborhood, resource utilization 270 may predict that a higher amount of resources and additional types of resources will be necessary/recommended for that neighborhood as opposed to a neighborhood that has fewer customers or where damages are estimated to be less severe. Resources may include hotel rooms, insurance adjustors, building materials, employees, inspectors, and contractors.

Resource prediction may be done prior to when the weather event takes place such that hotels can be reserved, insurance adjustors can be contacted, supplies may be ordered, inspections can be scheduled, customers may be notified, temporary employees may be hired, funds may be reserved, and other provisions may be made. Resource prediction may also be done after the weather event has occurred and may further be based on customer reports, media reports, actual weather data, and so on. In other cases, resource prediction may include a prediction made prior to the weather event and then updated over time based on new information that is received.

Resource module 270 can use a variety of methods, models, and/or rules in generating the resource predictions. For example, an adaptive model can be trained and/or created from historical weather and loss data. The rules may include business rules and regulatory rules (e.g., housing codes). Resource module 270 can then allocate resources to the various appropriate areas according to the predicted resource utilization. The allocation may be based on business rules, such as how many adjustors will be needed, the types of adjustors needed based on the adjustor's experience and the type of damage, current locations of adjustors in relation to the disaster, and a capacity of the adjustor for additional work.

GUI generation module 275 can generate one or more GUI screens that allow for interaction with a user. In at least one embodiment, GUI generation module 275 generates a graphical user interface allowing a user to report losses, track claims status, set preferences, and/or otherwise receive or convey information to the user (or multiple users). GUI generation module 275 can be used to generate customer density profiles, damage reports, and/or other visualizations in accordance with one or more embodiments of the present disclosure.

Figure 3:
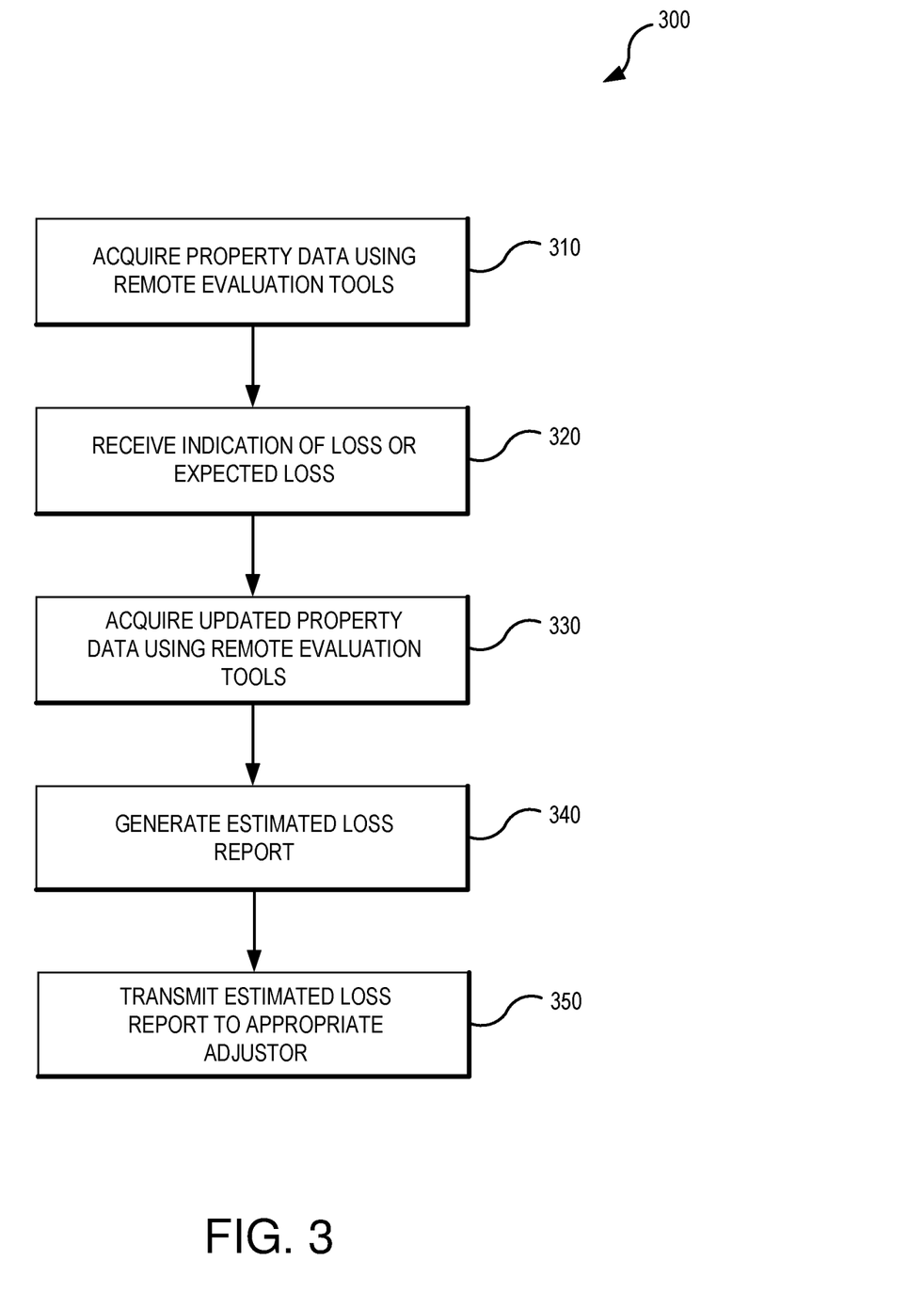
FIG. 3 is a flowchart illustrating a set of exemplary operations for performing an automated method of inspection in accordance with various embodiments of the present disclosure.

FIG. 3 is a flowchart illustrating a set of exemplary operations 300 for performing an automated method of inspection in accordance with various embodiments of the present disclosure. The operations illustrated in FIG. 3 may be performed by various system elements such as processor(s) 210, inspection engine 120, event manager 125, communication module 215, weather module 225, video module 230, sensor module 235, imagery module 240, estimate generator 255, and/or other modules, engines, devices, and/or or components.

As illustrated in FIG. 3, acquisition operation 310 acquires property data using remote evaluation tools (e.g., sensors, cameras, third-party data, etc.) Acquisition operation 310 may be triggered by an application for a new policy, a policy update or change in coverage, random review process, a scheduled review process (e.g., every three years), data from various databases (e.g., detection of permits), reports from users, neighborhood trends, or other types of active or passive triggers. Using the data acquired during acquisition operation 310, a user or property profile can be created and/or updated. Acquisition operation 310 may collect property information that includes pre-event data. This pre-event data can be used in the underwriting process and/or in creating a home or customer profile. For example, the size of the house, size of the roof, types of furniture, types of flooring, type of construction, etc. can all be collected and used in the underwriting process.

Receiving operation 320 can receive one or more indications of loss or expected loss. In accordance with some embodiments, an indication of loss may be reported by the user through a member service representative, an online reporting tool, or other manner. Claims reporting certain losses may require only that the customer send in images of the damage and/or that the customer fill out a form online. Other types of damage may require an insurance adjustor or damage inspector to physically come to the property to make an assessment.

In other embodiments, an indication of expected loss may be generated by event manager 125. For example, event manager 125 may analyze weather data to create weather profiles and other indications of the severity of weather (or other event) to estimate the severity of impending or incurred damage caused by the weather event. Using customer locations, a customer density profile may be generated and predictions about the amount and type of resources likely to be needed can be made. Depending on the predicted severity and types of damage, the types of inspections can be determined and indications of expected loss may be generated.

Evaluation operation 330 acquires updated property data using remote evaluation tools. In some embodiments, directed streaming video may be used to aid in an automated or remote analysis, creating estimates, and assessment of resource utilization. A remote analysis platform may be capable of connecting to various smart home technology, smoke detectors, water sensors, heat sensors, video cameras, robots, drones, imaging devices, various sensors, etc. In some embodiments, the remote analysis platform has a registration process for connecting to the smart home technology along with other assessment tools. The process may be automatically initiated from the remote analysis platform or a central controller for the smart home. As a result, the remote analysis platform can receive information about the property at regular intervals or upon detection of an event.

Pre-event and post-event data collected by acquisition operation 310 and evaluation operation 330 may be used to automatically populate various reports and used to automatically generate loss estimates during generation operation 340. The amount of damage and the type of damage may be estimated based on information regarding the loss event (e.g., weather, water, tornado, earthquake, etc.). In some cases, generation operation 340 may identify additional information that may be needed to complete the report and/or to supplement the initial evaluations in order to comply with company policies, industry standards, legal requirements, and/or other rules. Once the loss reports have been generated, transmission operation 350 transmits (e.g., over network 115) the estimated loss report to an appropriate adjustor.

Figure 4:
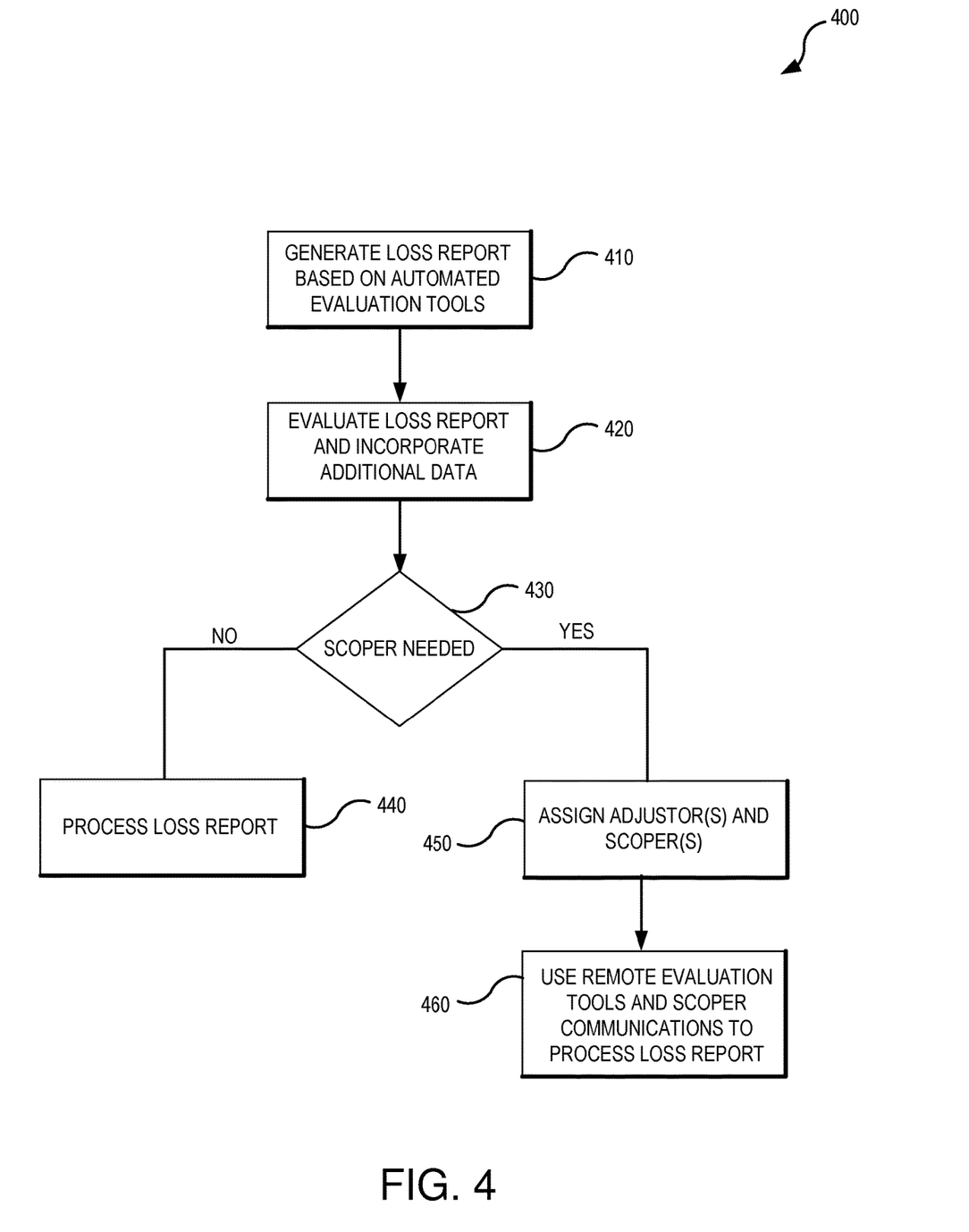
FIG. 4 is a flowchart illustrating a set of exemplary operations for generating loss reports in accordance with some embodiments of the present disclosure.

FIG. 4 is a flowchart illustrating a set of exemplary operations 400 for generating loss reports in accordance with some embodiments of the present disclosure. The operations illustrated in FIG. 4 may be performed by various system elements such as processor(s) 210, inspection engine 120, event manager 125, communications module 215, weather module 225, video module 230, sensor module 235, imagery module 240, estimate generator 255, assignment module 260, and/or other modules, engines, devices, and/or components. As illustrated in FIG. 4, generation operation 410 generates an initial loss report based on data received from automated evaluation tools. For example, the data can include aerial imagery, sensors, pictures, weather data, and other types of information that can be collected regarding the previous and current condition of the property.

In accordance with various embodiments, the loss report may be for a single property or for multiple properties. The multiple properties may be a neighborhood or other geographically bounded region (e.g., based on weather data, policy holder reports, etc.). In other cases, the multiple property reports may be for multiple properties from a single policy holder (e.g., home and auto). Still yet, the multiple property reports may be for similar property types (e.g., home or auto). In other embodiments, one or more of these conditions may be combined.

Once the loss report has been generated, evaluation operation 420 evaluates the report and determines if any more information can be obtained from the automated evaluation tools. For example, evaluation operation 420 may determine that additional aerial imagery may be available within the next two days. As another example, evaluation operation 420 may try to connect with one or more smart home sensors to collect current data. The time frame for receiving the additional information may be recorded and compared against goals for completing the initial loss report. In some cases, the issuance of the report may be delayed (e.g., for critical information or information becoming available within a short time frame) until the additional information is received and processed. Evaluation operation 420 also determines what additional information is needed, if any to process the loss, and can generate one or more recommendations regarding the additional information that would be useful.

Using the determination of what additional information is needed and/or the recommendations regarding the additional information that would be useful, determination operation 430 can determine whether a read scoper/damage inspector is needed. Insurance companies often send inspectors or adjustors (employees or contractors) to investigate a claim or a potential claim and to provide an estimate of the damage. If determination operation 430 determines that a read scoper/damage inspector is not needed, determination operation 430 branches to processing operation 440 where the loss is processed. If determination operation 430 determines that a read scoper/damage inspector is needed, or would be valuable, determination operation 430 branches to assignment operation 450 where a read scoper/damage inspector and/or one or more adjustors are assigned to assist in the evaluation of the loss. The read scoper/damage inspector may be sent to inspect the property and report the details (e.g., in real-time/near real-time) back to the adjuster. In some cases, communication operation 460 can be used to allow the use of remote evaluation tools (e.g., live video) and scoper/adjustor communications.

In general terms, the claims estimation process may be broken into two portions: data collection and estimation. In some embodiments, insurance companies may employ less-costly data collector personnel, or read scopers/damage inspectors, to collect the data and a more skilled inspector or adjustor to review the data collected by the read scoper/damage inspector and to generate the estimate.

The following example illustrates the process of estimating an insurance claim using a read scoper/damage inspector. An insurance company may receive a notice of loss from the customer. Based on available information (e.g., severity of damage, type of damage, availability inspectors or read scopers/damage inspectors, damage in the area, etc.), the insurance company may send a read scoper/damage inspector to the insured property to collect information. For example, a read scoper/damage inspector may be used when the damage will be easy to assess (e.g., home is a partial loss, other homes in the neighborhood have similar damage that has been inspected), or when the information will be viewable by the inspector using picture, video, etc. In some embodiments, policy holder or a sensor may provide information to the insurance company in combination with the read scoper/damage inspector.

The read scoper/damage inspector may collect the information using any method. For example, the read scoper/damage inspector may use a video camera and stream live video of the property, take images using a camera or other mobile device, use one or more sensors or detectors, take notes, write observations, etc. In some embodiments, the read scoper/damage inspector simply confirms that the damage as reported exists. The information collected by the read scoper/damage inspector is relayed (in real-time or after) to the inspector. The inspector then generates estimates without having to travel to a physical location. Accordingly, the insurance company may reduce costs by hiring a person to collect information rather than a specialist to inspect and estimate.

In a further example, the read scoper/damage inspector may be sent to the claim location to confirm damage. For example, if the insurance company has received estimates or has completed inspections of nearby homes after a storm, the insurance company may decide that the inspection of neighboring homes should be limited to information collection instead of an on-site inspection with an estimate. Sending a read scoper/damage inspector to the physical location and allowing an estimator/inspector to remotely assess the damage may reduce costs associated with assessing damage because the inspector need not travel to the physical location. This process may also reduce the amount of time it takes for the estimate to be provided and for any funds to be disbursed to policyholders.

Figure 5:
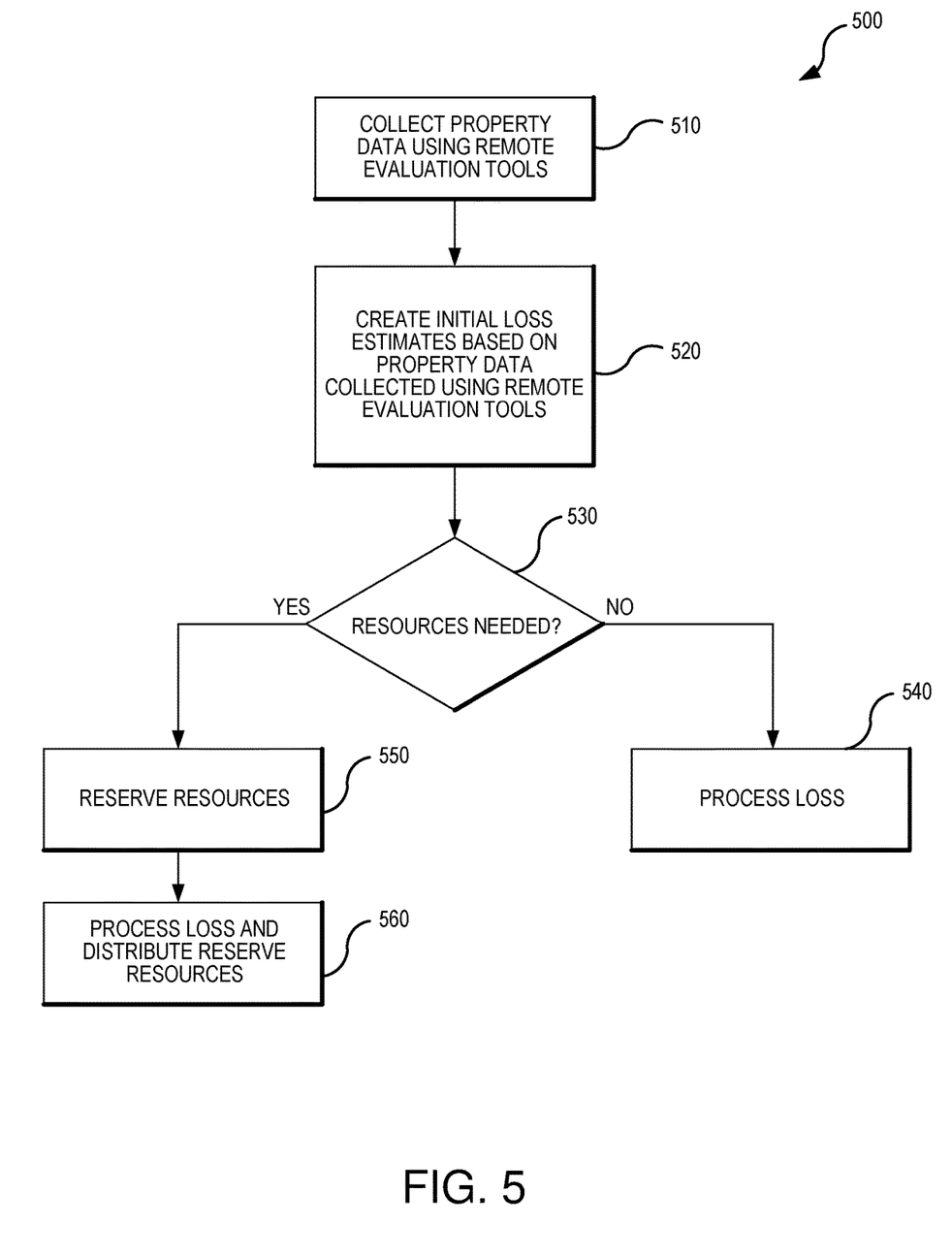
FIG. 5 is a flowchart illustrating a set of exemplary operations for reserving resources in accordance with one or more embodiments of the present disclosure.

FIG. 5 is a flowchart illustrating a set of exemplary operations 500 for reserving resources in accordance with one or more embodiments of the present disclosure. The operations illustrated in FIG. 5 may be performed by various system elements such as processor(s) 210, inspection engine 120, event manager 125, communications module 215, estimate generator 255, resource module 270, and/or other modules, engines, devices, and/or components. As illustrated in FIG. 5, collection operation 510 collects property data using remote evaluation tools. The property data may be used to estimate the amount of damage and the type of damage. In addition to the property data, other information regarding the loss event (e.g., weather, water, tornado, earthquake, etc.) may be used by estimation operation 520 to create an initial loss report. The property data and other information may include various statistics and distributions about an affected region which can be used in estimating the amount and type of damage. Using this information and the estimates of the amount and type of damage, predictions regarding resources may be made. In some embodiments, predictive and/or actual weather data may be acquired (e.g., in real-time, near real-time, on a periodic schedule, after completion of an event, etc.) and may be analyzed.

If resource determination operation 530 determines that no resources are needed, the resource determination operation 530 branches to processing operation 540 where the losses are processed. If resource determination operation 530 determines that resources are needed, then resource determination operation 530 branches to reservation operation 550 where the resources are reserved. These resources may include the types of inspectors, building materials, number of employees, contractors, hotels, etc. Then distribution operation 560 allocates the resources to the appropriate place and the losses are processed.

Figure 6:
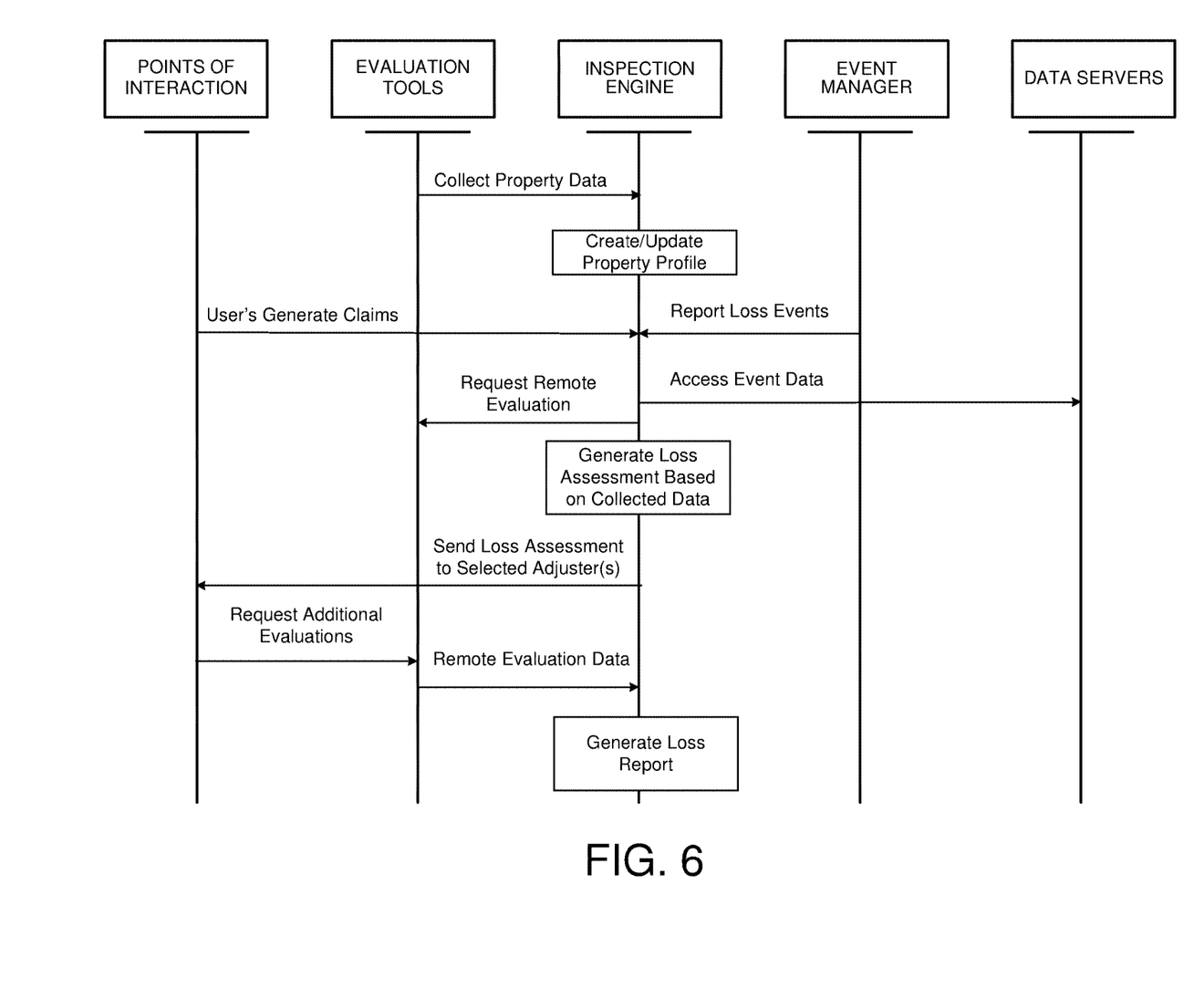
FIG. 6 is a sequence diagram illustrating various communications between components of an automated inspection system in accordance with one or more embodiments of the present disclosure.

FIG. 6 is a sequence diagram illustrating various communications between components of an automated inspection system in accordance with one or more embodiments of the present disclosure. As illustrated in FIG. 6, an inspection engine can collect property data from one or more evaluation tools. The evaluation tools may include weather sensors, vibration sensor, light sensors, motion sensors, humidity sensors, moisture sensors, chemical sensors, cameras (video and still), biosensors, data loggers, and others. These sensors may be controllable by the inspection engine or may just report data to the inspection engine.

The inspection engine can create (or update) a property profile based the data received from the evaluation tools. The event manager can report loss events or possible loss events (e.g., an earthquake in the area of the property) to the inspection engine. In some cases, property owners may use one or more points of interaction to submit claims to the inspection engine. Once a loss, or expected loss, is reported to the inspection engine, the inspection engine can access event data from one or more data servers and/or request a remote evaluation. Using this information, the inspection engine can generation a loss assessment which can be sent to one or more adjustors using the points of interaction. The adjustors can review the loss assessment and request additional evaluations from the evaluation tools and/or otherwise process the loss. Upon completion, inspection engine can generate a final loss report and cause payments to be made to the property owners.

Computer System Overview

Figure 7:
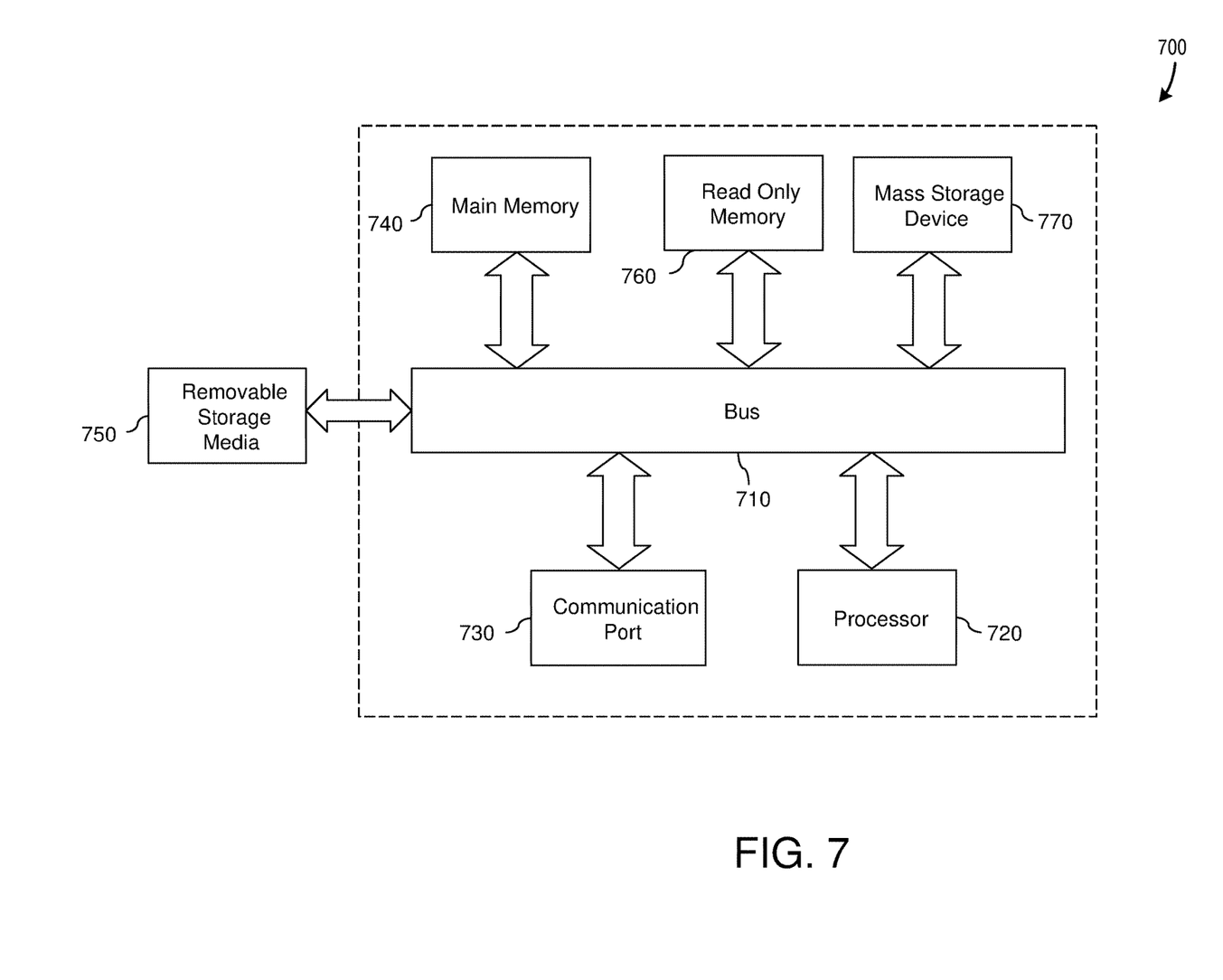
FIG. 7 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present disclosure may be utilized. According to the present example, the computer system includes a bus 710, at least one processor 720, at least one communication port 730, a main memory 740, a removable storage media 750, a read only memory 760, and a mass storage 770.

Processor(s) 720 can be any known processor, such as, but not limited to, an Intel® lines of processors, or AMD® lines of processors, or Motorola® lines of processors. Communication port(s) 730 can be any of an RS-232 port for use with a modem based dialup connection, a 10/100 Ethernet port, or a Gigabit port using copper or fiber. Communication port(s) 730 may be chosen depending on a network such a Local Area Network (LAN), Wide Area Network (WAN), or any network to which the computer system 700 connects.

Main memory 740 can be Random Access Memory (RAM), or any other dynamic storage device(s) commonly known in the art. Read only memory 760 can be any static storage device(s) such as Programmable Read Only Memory (PROM) chips for storing static information such as instructions for processor 720.

Mass storage 770 can be used to store information and instructions. For example, hard disks such as the Adaptec® family of SCSI drives, an optical disc, an array of disks such as RAID, such as the Adaptec family of RAID drives, or any other mass storage devices may be used.

Bus 710 communicatively couples processor(s) 720 with the other memory, storage and communication blocks. Bus 710 can be a PCI/PCI-X or SCSI based system bus depending on the storage devices used.

Removable storage media 750 can be any kind of external hard-drives, floppy drives, IOMEGA® Zip Drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

In conclusion, the present disclosure provides novel systems, methods and arrangements for automated methods of inspection. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computer-implemented method comprising:
   detecting, by a computing device, a potential event related to a property covered by an insurance policy based on a weather prediction;
   activating or deactivating, by the computing device, data feeds based on a severity of a weather event indicated in the weather prediction;
   connecting, by the computing device, to smart devices associated with the property covered by the insurance policy;
   acquiring, by the computing device, property data relating to the property, wherein acquiring the property data includes controlling a flight path and a camera setting of an unmanned aerial vehicle in a real-time manner so as to collect video data of the property;
   in response to detecting an event indicated by data from the smart devices:
      receiving, at an inspection engine, a loss notification indicating an expected loss associated with the property generated by an event manager;
      acquiring, using one or more remote evaluation tools and data from the smart devices, property data relating to the property,
      generating, by the computing device, a weather profile of a weather event affecting the property based at least in part on data from the data feeds;
      automatically generating, by the computing device, an estimated loss report based on the property data and the weather profile.

2. The computer-implemented method of claim 1, further comprising:
   collecting, using the one or more remote evaluation tools, pre-event property data using the remote evaluation tools before the loss notification is received by the inspection engine; and
   creating, using the pre-event property data, a property profile.

3. The computer-implemented method of claim 2, wherein generating the estimated loss report includes using the property profile to determine estimated losses.

4. The computer-implemented method of claim 2, wherein the pre-event property data includes dimensions of the property, a size of a roof of the property, and a type of construction of the property.

5. The computer-implemented method of claim 2, further comprising underwriting the insurance policy based on the pre-event property data.

6. The computer-implemented method of claim 1, further comprising:
   determining if an inspection of the property is needed to complete the estimated loss report; and
   selecting, when an inspection of the property is needed, a scoper to inspect the property in person and to communicate with an adjustor remotely located from the property.

7. The computer-implemented method of claim 6, further comprising selecting a method of inspection based on damage to the property identified by examining the property data acquired using the one or more remote evaluation tools.

8. The computer-implemented method of claim 1, wherein the event manager monitors weather data and generates the loss notification based on the expected loss.

9. A system comprising:
   a communication module to:
      connect to smart devices associated with a property covered by an insurance policy; and
      in response to detecting an event indicated by data from the smart devices:
         receive, via a network, a loss notification identifying one or more properties where a loss might have occurred;
   a data collection module, running on one or more processors, to:
      detect the potential event related to the property covered by the insurance policy based on a severity of a weather event indicated in a weather prediction,
      activate or deactivate data feeds based on the weather prediction, and
      collect property data about the current status of the one or more properties using remote evaluation tools and data from the smart devices, wherein collecting the property data comprises:
         acquiring the property data at least in part from an electrical grid, and
         acquiring the property data by controlling a flight path and a camera setting of an unmanned aerial vehicle in a real-time manner so as to collect video data of the property;
   an inspection engine to control the remote evaluation tools; and
   an estimate generator to:
      for each of the one or more properties, a weather profile of a weather event affecting each of the one or more properties based at least in part on data from the data feeds, and
      process the property data and produce a loss report identifying any damage to each of the one or more properties based on the status of the property and the weather profile.

10. The system of claim 9, wherein the data collection module also collects data regarding the one or more properties before the loss notification.

11. The system of claim 10, further comprising:
    a profile module to create property profiles for each of the one or more properties based on the data regarding the one or more properties before the loss notification is received; and
    a database to store the property profiles.

12. The system of claim 11, wherein the estimate generator accesses the property profiles and compares the data about the current status of the one or more properties with the property profile to assess damage to the one or more properties.

13. The system of claim 9, further comprising an assignment module to identify an adjustor based on the damage to the one or more properties identified in the loss report.

14. The system of claim 9, wherein the remote evaluation tools include smart sensors within the property, cameras, and weather sensors.

15. A non-transitory computer-readable medium containing instructions that when executed by one or more processors cause a machine to:
    detect a potential event related to a property covered by an insurance policy based on a severity of a weather event indicated in a weather prediction;

activate or deactivate data feeds based on the weather prediction;

collect pre-event property data relating to the property covered by the insurance policy;

connect to smart devices associated with the property; and in response to detecting an event indicated by data from the smart devices:

receive a loss notification identifying the property covered by the insurance policy;

acquire, using one or more remote evaluation tools and data from the smart devices, current property data relating to the property, wherein acquiring the property data includes controlling a flight path and a camera setting of an unmanned aerial vehicle in a real-time manner so as to collect video data of the property, generate a weather profile of a weather event affecting the property based at least in part on data from the data feeds; and automatically generate an estimated loss report identifying damage to the property that would result in payout from the insurance policy, wherein the estimated loss report is based on the pre-event property data, the current property data, and the weather profile.

16. The non-transitory computer-readable medium of claim 15 containing instructions that when executed by the one or more processors further cause the machine to underwrite the insurance policy based on the pre-event property data.

17. The non-transitory computer-readable medium of claim 15 containing instructions that when executed by the one or more processors further cause the machine to:

determine if an inspection of the property is needed to complete the estimated loss report; and select, when an inspection of the property is needed, a scoper to inspect the property in person and communicate with an adjustor remotely located from the property.

18. The non-transitory computer-readable medium of claim 17 containing instructions that when executed by the one or more processors further cause the machine to select the adjustor based on damage to the property identified by examining the current property data acquired using the one or more remote evaluation tools.

19. The non-transitory computer-readable medium of claim 15 containing instructions that when executed by the one or more processors further cause the machine to communicate with an event manager that monitors weather data and generates the loss notification based on an expected loss.

20. The non-transitory computer-readable medium of claim 15 containing instructions that when executed by the one or more processors further cause the machine to reserve a set of resources.

* * * * *